(12) United States Patent
Niu et al.

(10) Patent No.: US 9,005,724 B2
(45) Date of Patent: Apr. 14, 2015

(54) INK-PRINTABLE COMPOSITIONS

(75) Inventors: Bor-Jiunn Niu, San Diego, CA (US); Haigang Chen, San Diego, CA (US); Lisa A. Underwood, Escondido, CA (US); Joanna G Pool, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/876,840

(22) PCT Filed: Oct. 5, 2010

(86) PCT No.: PCT/US2010/051460
§ 371 (c)(1),
(2), (4) Date: May 28, 2013

(87) PCT Pub. No.: WO2012/047203
PCT Pub. Date: Apr. 12, 2012

(65) Prior Publication Data
US 2013/0236660 A1    Sep. 12, 2013

(51) Int. Cl.
*B41M 5/00*    (2006.01)
*B41M 5/52*    (2006.01)
*B41M 5/50*    (2006.01)
(Continued)

(52) U.S. Cl.
CPC .............. *B41M 5/5254* (2013.01); *B32B 27/08* (2013.01); *B32B 27/306* (2013.01); *B41M 5/025* (2013.01); *C09D 11/02* (2013.01); *B41M 5/0041* (2013.01); *Y10T 428/24802* (2015.01); *B41M 5/502* (2013.01); *B41M 2205/34* (2013.01); *B41M 2205/38* (2013.01); *C09D 11/101* (2013.01); *B29D 7/01* (2013.01)

(58) Field of Classification Search
CPC ........ B41M 5/041; B41M 5/50; B41M 5/025; B41M 5/035; B41M 5/0041; B32B 27/08; B32B 27/306; C09D 11/02
USPC ...................... 428/32.16, 32.23, 32.38, 195.1
See application file for complete search history.

(56) References Cited

U.S. PATENT DOCUMENTS 5,712,041 A    1/1998    Breant et al.
5,912,085 A    6/1999    Ito et al.
(Continued)

FOREIGN PATENT DOCUMENTS

JP    S62-197437    9/1987
JP    1998-310673 A    11/1998
(Continued)

OTHER PUBLICATIONS

International Search Report and Written Opinion of the International Searching Authority for counterpart PCT International Patent Application PCT/US2010/051460, dated Jul. 26, 2011, 8 pages.

*Primary Examiner* — Betelhem Shewareged
(74) *Attorney, Agent, or Firm* — North Shore Associates

(57) ABSTRACT

A composition includes a mixture of a first polymer and a second polymer. The first polymer is selected from the group consisting of a polymer including ethylene residues and vinyl alcohol residues and a polymer including vinyl alcohol residues. The second polymer includes ethylene residues, vinyl acetate residues and maleic anhydride residues. An amount of the first polymer in the mixture is about 50% to about 95% by weight. An ink-printable composition includes the above composition as an ink-receiving material.

10 Claims, 5 Drawing Sheets

(51) Int. Cl.
  *C09D 11/101* (2014.01)
  *B29D 7/01* (2006.01)
  *B32B 27/08* (2006.01)
  *B32B 27/30* (2006.01)
  *B41M 5/025* (2006.01)
  *C09D 11/02* (2014.01)

(56) References Cited

U.S. PATENT DOCUMENTS

| | | | |
|---|---|---|---|
| 6,054,007 A | 4/2000 | Boyd et al. | |
| 6,068,897 A | 5/2000 | Adur et al. | |
| 6,106,982 A | 8/2000 | Mientus et al. | |
| 6,117,552 A | 9/2000 | Hanada et al. | |
| 6,159,605 A | 12/2000 | Hanada et al. | |
| 6,177,197 B1 | 1/2001 | Imashiro et al. | |
| 6,316,120 B1 | 11/2001 | Emslander | |
| 6,372,841 B1 | 4/2002 | Anderson et al. | |
| 6,451,911 B1 | 9/2002 | Bertin et al. | |
| 6,465,078 B1 | 10/2002 | Kawai et al. | |
| 6,531,231 B1 | 3/2003 | Ito et al. | |
| 6,589,636 B2 | 7/2003 | Emslander et al. | |
| 6,592,971 B2 | 7/2003 | Ochiai et al. | |
| 6,620,469 B2 | 9/2003 | Totani et al. | |
| 6,623,841 B1 | 9/2003 | Venkatasanthanam et al. | |
| 6,720,042 B2 | 4/2004 | Ylitalo et al. | |
| 6,800,341 B2 | 10/2004 | Emslander et al. | |
| 6,857,737 B2 | 2/2005 | Emslander et al. | |
| 6,878,423 B2 | 4/2005 | Nakanish | |
| 7,714,072 B2 | 5/2010 | Michie et al. | |
| 2001/0009712 A1 | 7/2001 | Totani et al. | |
| 2003/0171480 A1 | 9/2003 | Egolf et al. | |
| 2006/0014022 A1 | 1/2006 | Kendig et al. | |
| 2006/0099436 A1* | 5/2006 | Schwark et al. | 428/474.4 |
| 2006/0122311 A1* | 6/2006 | Kim et al. | 524/445 |
| 2006/0222789 A1 | 10/2006 | Dontula et al. | |
| 2006/0257652 A1 | 11/2006 | Su | |
| 2007/0054070 A1 | 3/2007 | Laney | |
| 2007/0218228 A1 | 9/2007 | Kwok et al. | |
| 2008/0220353 A1 | 9/2008 | Dontula et al. | |
| 2008/0274245 A1 | 11/2008 | Lee et al. | |
| 2009/0011263 A1 | 1/2009 | Forloni | |
| 2009/0092828 A1 | 4/2009 | Meijlink | |
| 2009/0297857 A1 | 12/2009 | Pascal et al. | |
| 2010/0015423 A1 | 1/2010 | Schaefer et al. | |
| 2010/0099817 A1 | 4/2010 | Bizet et al. | |
| 2010/0112256 A1 | 5/2010 | Bonnet et al. | |
| 2013/0236660 A1* | 9/2013 | Niu et al. | 428/32.16 |

FOREIGN PATENT DOCUMENTS

| | | |
|---|---|---|
| WO | 9722655 A1 | 6/1997 |
| WO | 9924485 A2 | 5/1999 |
| WO | 0018836 A1 | 4/2000 |
| WO | 2009126133 A1 | 10/2009 |

* cited by examiner

INK-PRINTABLE COMPOSITIONS

CROSS-REFERENCE TO RELATED APPLICATIONS

N/A

STATEMENT REGARDING FEDERALLY SPONSORED RESEARCH OR DEVELOPMENT

N/A

BACKGROUND

The present disclosure relates to printing media and methods of preparing printing media.

Inkjet printers are now very common and affordable and allow one to economically obtain decent print quality and print durability at relatively high speed. They are used in home printing, office printing and commercial printing. Inkjet printers are utilized to print on a number of different media.

Because of the many positive aspects of inkjet printing, it is desirable to use inkjet printing to print on thin planar films that are employed for displays, particularly commercial displays. The thin planar films used for such displays have many different compositions. The inks most commonly used in inkjet printers are water-based or solvent-based but also include UV-curable inks. Some of the more suitable materials for display films are not very receptive to inkjet inks and, if receptive, the resulting printed material typically suffers from one or more negative qualities such as, for example, poor adhesion to the display material, poor durability and poor image quality.

BRIEF DESCRIPTION OF THE DRAWINGS

The drawings provided herein are not to scale and are provided for the purpose of facilitating the understanding of certain examples in accordance with the principles described herein and are provided by way of illustration and not limitation on the scope of the appended claims.

DETAILED DESCRIPTION

Figure 1:
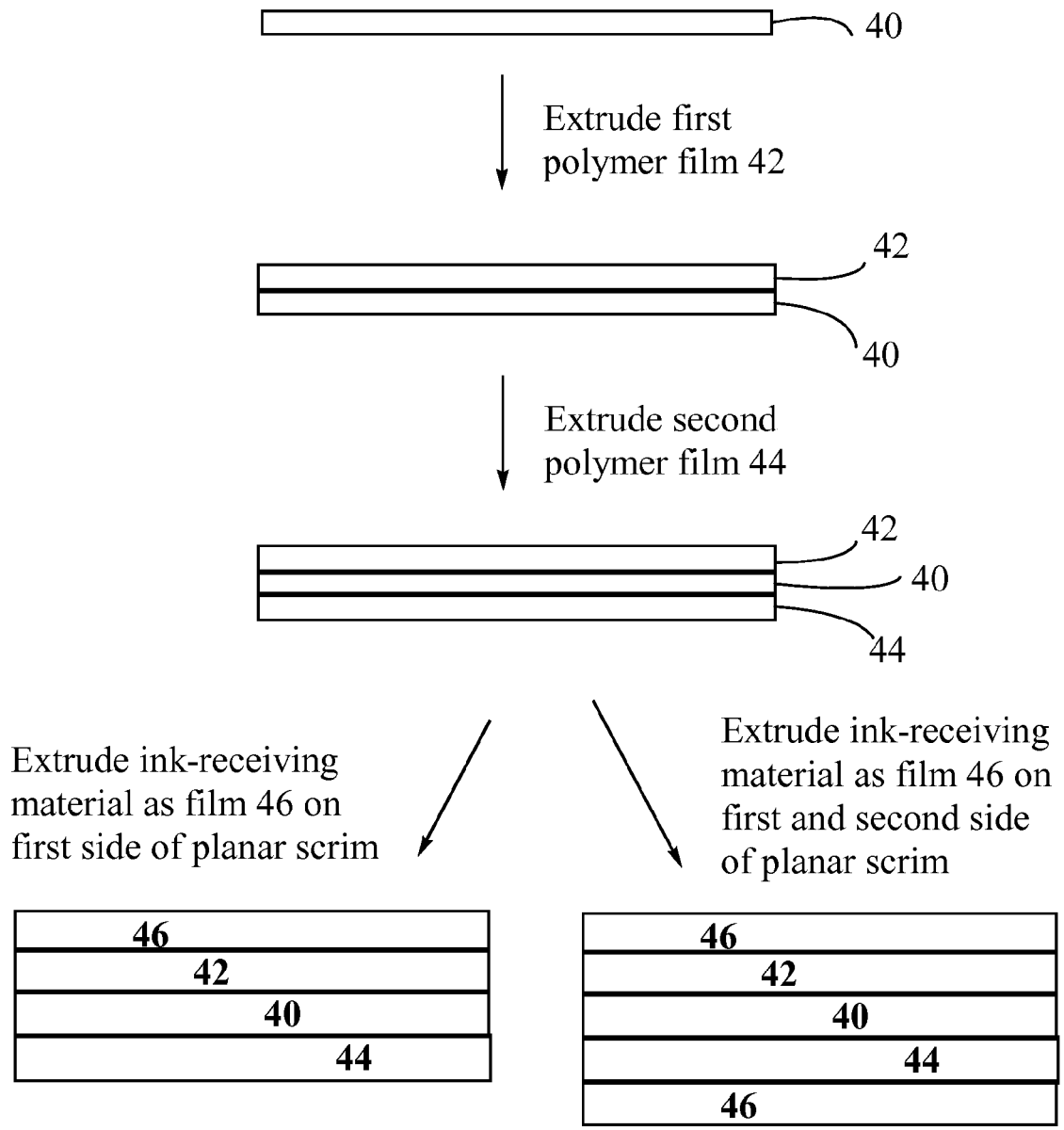
FIG. 1 is a diagram illustrating a method of preparing an ink-printable composition according to an example in accordance with the principles described herein.

Some examples in accordance with the principles described herein are directed to a composition comprising a mixture of a first polymer selected from the group consisting of a polymer comprising ethylene residues and vinyl alcohol residues and a polymer comprising vinyl alcohol residues and a second polymer comprising ethylene residues, vinyl acetate residues and maleic anhydride residues. An amount of the first polymer in the mixture is about 50% to about 95% by weight. In some examples the mixture is extrudable, which means that the mixture, after melting, is able to form a stable film using an extruder.

Some examples in accordance with the principles described herein are directed to an ink-printable composition, which comprises an ink-receiving material in an extruded form. The ink-receiving material comprises a mixture of a first polymer selected from the group consisting of a polymer comprising ethylene residues and vinyl alcohol residues and a polymer comprising vinyl alcohol residues and a second polymer comprising ethylene residues, vinyl acetate residues and maleic anhydride residues. An amount of the first polymer in the mixture is about 50% to about 95% by weight. As indicated above, the ink-receiving material is in an extruded form, which means that the ink-receiving material has its own three-dimensional shape or profile imparted from the extrusion die and chill roll and is in a form for use as an ink-receiving layer for inkjet printing applications. The surface of the ink-receiving material may be smooth or rough (e.g., textured).

The ink-receiving material, and the ink-printable compositions comprising the ink-receiving material, of the present examples in accordance with the principles described herein exhibit at least all of the following characteristics: good adhesion of a display ink, good durability (resistance to chemical rubbing and scratching) and good image quality. The term "good" as used above means that the ink-receiving material exhibits rankings of lower than 3 (out of 5) in tests for image quality, chemical rubbing resistance, scratch resistance and ink adhesion, examples of which by way of illustration and not limitation, are set forth below.

An ink-printable composition is one that includes a feature that is capable of receiving and retaining ink that is applied to the feature such as, for example, ink that is applied to, e.g., printed on, the feature of the ink-printable composition. This feature should have one or both of good affinity and good compatibility for the ink that is applied to the feature. The feature should also permit relatively fast drying of the ink that is applied. The feature of the ink-printable composition that accomplishes this purpose is referred to herein as an ink-receiving material.

In accordance with the principles described herein, the ink-receiving material comprises a mixture of polymers. The polymers may be linear or branched or a combination thereof. A linear polymer comprises a linear chain of atoms and a branched polymer comprises a branched chain of atoms. The relationship of the different monomer residues in the polymer may be random, alternating, periodic, or block, for example, or a combination of two or more thereof.

The phrase "monomer residue" as used herein refers to a structural unit or building block or repeat unit of a polymer and is derived from a monomer in that it results from the polymerization of the monomer. For example, by way of illustration and not limitation, a monomer that comprises an unsaturation that is a double bond between carbon atoms, when polymerized, results in monomer residues in a polymer where the monomer residues comprise a single bond between the two carbon atoms, the double bond thus becoming saturated during the polymerization process. The monomer residues are not the monomer itself but are derived from the monomer.

Each of the polymers comprises about 100 to about 500,000 or more monomer residues, or about 100 to about 400,000 or more monomer residues, or about 100 to about 300,000 or more monomer residues, or about 100, to about 200,000 or more monomer residues, or about 100 to about 100,000 or more monomer residues, or about 500 to about 200,000 monomer residues, or about 500 to about 100,000 monomer residues, or about 1,000 to about 100,000 monomer residues, or about 2,000 to about 100,000 monomer residues, or about 1,000 to about 50,000 monomer residues, or about 5,000 to about 50,000 monomer residues, for example. The number of monomer residues depends on one or more of the extrudability of the polymer mixture, the nature of the ink to be applied to the ink-receiving material, the nature of the polymers that form the ink-receiving material, the physical properties of an ink-receiving material for the extrusion process and the physical properties of an ink-receiving material in extruded form, for example. It is a characteristic of the present examples in accordance with the principles described herein that the ink-receiving material can be tailored to a particular ink, for example, by adjusting the weight percentage of the monomer residues in the polymers that are employed to prepare the ink-receiving material and also by adjusting the weight percentages of the first and second polymers in the mixture.

In some examples the average molecular weight (grams/mole) of the polymer is about 1,000 to about 1,000,000 or more, or about 5,000 to about 1,000,000, or about 10,000 to about 900,000, or about 100,000 to about 900,000, or about 1,000 to about 750,000, or about 1,000 to about 500,000, or about 10,000 to about 500,000, or about 100,000 to about 500,000, for example.

At least one of the polymers (arbitrarily referred to herein as a first polymer) is selected from the group consisting of polymers comprising ethylene residues and vinyl alcohol residues and polymers comprising vinyl alcohol residues. The phrase "vinyl alcohol residue" refers to the state of the residue in the final polymer and is independent of the manner in which a polymer that comprises a vinyl alcohol residue may be prepared. For example, by way of illustration and not limitation, a first polymer comprising ethylene residues and vinyl alcohol residues may be prepared by polymerizing ethylene and vinyl acetate and then hydrolyzing the acetate moieties to produce the free alcohol moiety of a vinyl alcohol residue.

A percentage by weight of vinyl alcohol residues in the first polymer is about 50% to about 100%, or about 50% to about 99%, or about 50% to about 95%, or about 50% to about 90%, or about 50% to about 85%, or about 50% to about 80%, or about 50% to about 75%, or about 50% to about 70%, or about 50% to about 65%, or about 50% to about 60%, or about 50% to about 55%, or about 60% to about 100%, or about 60% to about 99%, or about 60% to about 95%, or about 60% to about 90%, or about 60% to about 85%, or about 60% to about 80%, or about 60% to about 75%, or about 60% to about 70%, or about 60% to about 65%, or about 65% to about 100%, or about 65% to about 99%, or about 65% to about 95%, or about 65% to about 90%, or about 65% to about 85%, or about 65% to about 80%, or about 65% to about 75%, or about 65% to about 70%, or about 70% to about 100%, or about 70% to about 99%, or about 70% to about 95%, or about 70% to about 90%, or about 70% to about 85%, or about 70% to about 80%, or about 70% to about 75%, or about 80% to about 100%, or about 80% to about 99%, or about 80% to about 95%, or about 80% to about 90%, or about 80% to about 85%, for example. As indicated above, the percentage is based on weight, that is, the weight of one of the monomers in the monomer mixture to be polymerized and the total weight of the monomer mixture. It should be evident that a percentage by weight for the vinyl alcohol residues of 100% means that the polymer comprises only vinyl alcohol residues while a percentage by weight of less than 100% means that the polymer comprises also ethylene residues.

A percentage by weight of ethylene residues in the first polymer is about 0% to about 50%, or about 0% to about 40%, or about 0% to about 30%, or about 0% to about 20%, or about 0% to about 15%, or about 0% to about 10%, or about 1% to about 50%, or about 1% to about 40%, or about 1% to about 30%, or about 1% to about 20%, or about 1% to about 15%, or about 1% to about 10%, or about 5% to about 50%, or about 5% to about 40%, or about 5% to about 30%, or about 5% to about 20%, or about 5% to about 15%, or about 5% to about 10%, or about 10% to about 50%, or about 10% to about 40%, or about 10% to about 30%, or about 10% to about 20%, or about 10% to about 15%, or about 20% to about 50%, or about 20% to about 40%, or about 20% to about 30%, or about 30% to about 50%, or about 30% to about 40%, or about 40% to about 50%, for example.

In some examples the ratio of the percentage of vinyl alcohol residues to the percentage of ethylene residues in the first polymer is about 50 to 50, or about 60 to about 40, or about 65 to about 35, or about 70 to about 30, or about 75 to about 25, or about 80 to about 20, or about 85 to about 15, or about 90 to about 10, for example. In some examples the vinyl alcohol residues in the first polymer are in the range of about 50% to about 95% with the corresponding range of the ethylene residues in the range of about 50% to about 5%. In some examples the vinyl alcohol residues in the first polymer are in the range of about 50% to about 90% with the corresponding range of the ethylene residues in the range of about 50% to about 10%. In some examples the vinyl alcohol residues in the first polymer are in the range of about 60% to about 90% with the corresponding range of the ethylene residues in the range of about 40% to about 10%. In some examples the vinyl alcohol residues in the first polymer are in the range of about 50% to about 80% with the corresponding range of the ethylene residues in the range of about 50% to about 20%.

As mentioned above, in some examples in accordance with the principles described herein, the first polymer may be commercially available. Examples, by way of illustration and not limitation, of commercially available polymers that are suitable as the first polymer include SOARNOL® A4412 polymer (Noltex, L.L.C., LaPorte, Tex. or Soarus L.L.C. Arlington Height, Ill.) (composition of about 56% vinyl alcohol residues and about 44% ethylene residues with melt index number at 12), SOARNOL® E3808 polymer (Noltex, L.L.C. or Soarus L.L.C.) (composition of about 62% vinyl alcohol residues and about 38% ethylene residues with melt index number at 8), and SOARNOL® AT4403 polymer (Noltex, L.L.C. or Soarus L.L.C.) (composition of about 56% of vinyl alcohol residues and about 44% ethylene residues with melt index number at 3), for example. As indicated above, other percentages of ethylene residues and vinyl alcohol residues in the first polymer may be employed.

At least one of the polymers (arbitrarily referred to herein as a second polymer) of the ink-receiving material comprises ethylene residues, vinyl acetate residues and maleic anhydride residues. A percentage by weight of ethylene residues in the second polymer is about 50% to about 90%, or about 50% to about 80%, or about 50% to about 75%, or about 50% to about 70%, or about 60% to about 90%, or about 60% to about 80%, or about 60% to about 75%, or about 60% to about 70%, or about 65% to about 90%, or about 65% to about 80%, or about 65% to about 75%, or about 65% to about 70%, or about 70% to about 90%, or about 70% to about 85%, or about 70% to about 80%, or about 70% to about 75%, for example.

A percentage by weight of vinyl acetate residues in the second polymer is about 10% to about 50%, or about 10% to about 40%, or about 10% to about 35%, or about 10% to about 30%, or about 10% to about 25%, or about 10% to about 20%, or about 10% to about 15%, or about 15% to about 50%, or about 15% to about 40%, or about 15% to about 30%, or about 15% to about 25%, or about 15% to about 20%, or about 20% to about 50%, or about 20% to about 40%, or about 20% to about 30%, or about 20% to about 25%, for example.

A percentage by weight of maleic anhydride residues in the second polymer is about 0.01% to about 10%, or about 0.01% to about 5%, or about 0.01% to about 4%, or about 0.01% to about 3%, or about 0.01% to about 2%, or about 0.01% to about 1%, or about 0.05% to about 10%, or about 0.05% to about 5%, or about 0.05% to about 4%, or about 0.05% to about 3%, or about 0.05% to about 2%, or about 0.05% to about 1%, or about 0.1% to about 10%, or about 0.1% to about 5%, or about 0.1% to about 4%, or about 0.1% to about 3%, or about 0.1% to about 2%, or about 0.1% to about 1%, or about 0.5% to about 10%, or about 0.5% to about 5%, or about 0.5% to about 4%, or about 0.5% to about 3%, or about 0.5% to about 2%, or about 0.5% to about 1%, or about 1% to about 10%, or about 1% to about 5%, or about 1% to about 4%, or about 1% to about 3%, or about 1% to about 2%, for example.

In an example an amount of ethylene residues in the second polymer is about 70% to about 80%, an amount of vinyl acetate residues in the second polymer is about 20% to about 30% and an amount of maleic anhydride residues in the second polymer is about 0.05% to about 5%. As mentioned above, in some examples the second polymer may be commercially available. One example, by way of illustration and not limitation, of a commercially available polymer that is suitable as the second polymer is OREVAC-T® 9304 terpolymer (Arkema Canada, Inc., Bécancour, Québec). The composition of OREVAC-T® 9304 polymer is about 74.84% of ethylene residues, about 25.00% of vinyl acetate residues and about 0.16% of maleic anhydride residues. Another example, by way of illustration and not limitation, of a commercially available polymer that is suitable as the second polymer is BYNEL® E418 (DuPont, Wilmington, Del.), which is a maleic anhydride modified ethylene vinyl acetate. As indicated above, other percentages of ethylene residues, vinyl acetate residues and maleic anhydride residues in the second polymer may be employed and the polymer may also comprise additional different monomer residues.

The polymers utilized in examples in accordance with the principles described herein may be obtained by polymer synthesis from appropriate monomers or monomer residue precursors or some of the polymers may be obtained commercially. The term "monomer" or "monomer unit" means a molecule capable of undergoing polymerization to form a polymer. A monomer residue precursor is a monomer that results in the desired monomer residue by additional treatment after polymerization. For example, a polymer comprising ethylene residues and vinyl alcohol residues may be prepared by copolymerizing ethylene and vinyl acetate and subsequently hydrolyzing the acetate residues in the resulting polymer to give the desired polymer with vinyl alcohol residues. In this particular example, vinyl acetate is a monomer residue precursor.

Examples of approaches for preparing polymers, by way of illustration and not limitation, include emulsification or emulsion polymerization, free radical polymerization, bulk polymerization, transition metal catalyzed coupling, condensation (step-growth) polymerization, living polymerization, living radical polymerization, addition (chain reaction) polymerization (anionic, etc.), coordination polymerization, ring opening polymerization, solution polymerization, plasma polymerization, radical polymerization, atom transfer radical polymerization, and reversible addition fragmentation, for example.

The mixture of polymers that form the ink-receiving material is a physical mixture obtained by mixing the polymers together. Mixing may be accomplished by such methods that include but are not limited to blending a mixture of pre-dried individual polymer pellets in a mixing hopper prior to being conveyed to extruder or by compounding a mixture of pre-dried individual polymer pellets into a single pellet, for example. The extent of mixing should be that sufficient to provide for one or both of uniform performance during extrusion and uniformity of the extruded product.

A percentage by weight of the first polymer in the ink-receiving material is about 50% to about 95%, or about 50% to about 90%, or about 50% to about 85%, or about 50% to about 80%, or about 50% to about 75%, or about 50% to about 70%, or about 50% to about 65%, or about 50% to about 60%, or about 50% to about 55%, or about 60% to about 95%, or about 60% to about 90%, or about 60% to about 85%, or about 60% to about 80%, or about 60% to about 75%, or about 60% to about 70%, or about 60% to about 65%, or about 65% to about 95%, or about 65% to about 90%, or about 65% to about 85%, or about 65% to about 80%, or about 65% to about 75%, or about 65% to about 70%, or about 70% to about 95%, or about 70% to about 90%, or about 70% to about 85%, or about 70% to about 80%, or about 70% to about 75%, or about 80% to about 95%, or about 80% to about 90%, or about 80% to about 85%, for example.

As mentioned above, the percentage of the first polymer and the second polymer in the ink-receiving material is based on weight, that is, the weight of the first polymer and the total weight of the combined polymers (in this example, first and second polymers). In some examples the ratio of the percentage the first polymer to the percentage of the second polymer is about 60 to about 40, or about 65 to about 35, or about 70 to about 30, or about 75 to about 25, or about 80 to about 20, or about 85 to about 15, or about 90 to about 10, for example. In some examples the percentage of the first polymer in the composition is in the range of about 50% to about 95% with the corresponding range of the second polymer of about 50% to about 5%. In some examples the percentage of the first polymer in the composition is in the range of about 60% to about 90% with the corresponding range of the second polymer of about 40% to about 10%. In some examples the percentage of the first polymer in the composition is in the range of about 65% to about 85% with the corresponding range of the second polymer of about 35% to about 15%.

In some examples in accordance with the principles described herein, the ink-receiving material according to the present disclosure may include one or more additives such as fillers, pigments, processing aids, and performance aids, for example. In an example, the additives are added to the mixture before the extrusion process either during the initial mixture preparation or in a separate mixing step.

Some examples of the ink-printable compositions in accordance with the principles described herein further comprise a support associated with the ink-receiving material. The support is any substance that provides one or more of structure and integrity to the ink-printable compositions and added adhesion to further support layers so that the ink-printable compositions may be employed for their intended use. The ink-receiving material is associated with the support, which means that the relationship between the ink-receiving material and the support is one in which the ink-receiving material exhibits substantially non-removable adherence to the support. One or more layers of ink-receiving material may be associated with the support. The phrase "substantially non-removable adherence" means that the average peel force is equal to or greater than about 7 newtons per 50.8 mm wide strip with crosshead speed at 50.8 mm per minute measured by an Instron device (Instron Industrial Products, Grove City Pa.).

The support may comprise one or more components that provide for different functions within the ink-printable composition. The components may have any number of forms such as, for example, layers. Examples, by way of illustration and not limitation, of components that may form part of the support include tie components, structure-providing components (substrates), scrims (woven and non-woven material), moisture barriers, vapor/air barriers and adhesion promoters, for example.

The support or one or more of the components of the support may be translucent, transparent, or opaque and may be of any color such as, for example, white or grey, depending on the end use of the ink-printable composition with a printed image thereon.

In some examples the one or more components of the support are in the form of layers associated with one another in a predetermined manner. The layers may be in the form of a film, sheet, woven scrim and non-woven scrim, for example. The phrase "non-woven scrim" refers to a layer that is not truly woven but rather pseudo woven, that is, the non-woven scrim has woven characteristics as the result of long fibers or filaments being bonded together by one or more of chemical treatment (including, e.g., solvent treatment), mechanical treatment (e.g., embossing), and heating.

In some examples the support comprises at least one structure-providing component or substrate, which provides additional physical integrity and form to the ink-printable composition. The nature of the substrate is dependent on one or more of an intended use of the ink-printable composition, a nature of the ink-receiving material, a designed tear strength, a designed tensile strength, a designed surface texture and a designed longevity, for example. The one or more substrates of the support may be fabricated from, for example, polyolefins, polyesters, polyurethanes, polyvinyl chlorides, polyamides, polystyrene, ethylene vinyl alcohol, polylactic acid, and cellulose and combinations of two or more of the above. In some examples, the substrates may be fabricated from polyethylene, polypropylene, polymethylpentene, polybutylene, polyethylene terephthalate, polystyrene, polyvinyl chloride, polyurethane, polyacrylate, polyvinyl acetate, polysulfone, polyvinylidene chloride, polyethylene methyl acrylate, polyethylene methacrylic acid, polyethylene ethyl acrylate, nylon, polyvinyl pyrillidone, polyether ester, polyether amide, polycarbonate, styrene acrylonitrile polymer, polymethyl methacrylates, cellulosics, fluoroplastics, acrylonitrile butadiene styrene polymer, polyethylenevinyl alcohol, and polylactic acid, and copolymers (two or more monomer residues) and combinations of two or more of the above.

The substrate may be in the form of an extruded film or layer, a woven layer (scrim), non-woven scrim, or paper, for example. In some examples, one or more of the substrates of examples of the present ink-printable compositions may be fabricated from polyethylene (PE), polypropylene (PP), polyethylene terephthalate (PET), ethylene vinyl acetate (EVA), polystyrene (PS), polycarbonate, and polyamide polymer and combinations of two or more of the above, for example. In an example of the present ink-printable composition, the substrate is fabricated from PE. In another example of the present ink-printable compositions, the substrate is fabricated from one or both of low density PE (LDPE) and high density PE (HDPE). In some examples one or more of the substrates is a woven layer (scrim) of one or both of LDPE and HDPE.

The thickness of the substrate depends on one or more of the physical form of the substrate (e.g., extruded layer, extruded film, woven scrim, or non-woven scrim), the nature of the function of the substrate (for example, provide one or more of stiffness (rigidity), tear and tensile strength, opacity, longevity, and ability to be recycled), the nature of the ink-receiving material, the nature of the material with which the substrate is associated, for example. In some examples the thickness of the substrate in the form of an extruded layer or a scrim is about 10 to about 500 microns, or about 25 to about 500 microns, or about 50 to about 500 microns, or about 100 to about 500 microns, or about 250 to about 500 microns, or about 10 to about 400 microns, or about 10 to about 300 microns, or about 10 to about 200 microns, or about 10 to about 100 microns, or about 50 to about 400 microns, or about 50 to about 300 microns, or about 50 to about 200 microns, or about 50 to about 100 microns, for example.

In some examples the support includes a tie component, which provides for substantially non-removable adherence of the ink-receiving material to the support. It is to be understood that use of the tie component is optional and is based on the relative degree of ability to bond and compatibility between the ink-receiving material and the one or more substrates of the support. In some examples one or both of the nature and the selection of the tie component may be dependent on one or more of the composition of the ink-receiving material and of a component of the support to which the ink-receiving material is to be bonded or attached, for example. In some examples one or both of the nature and the selection of a tie layer may be independent of such factors and simply dependent on obtaining sufficient adhesion of the layers to be adhered. In some examples the tie component may be an extruded film or co-extruded film as a tie layer.

In some examples the tie component is a material that can bond to various substrates such as polyolefins (e.g., ethylene-based, propylene-based, polyethylene and polypropylene blends), polyamides, polyvinyl alcohols, polyethyl oxazolines, polyesters, polycarbonates, polystyrenes, polyethylene vinyl alcohol, and polyethylene acrylate copolymers, for example. Examples, by way of illustration and not limitation, of the composition of suitable tie components include extrudable resins such as EVA resins, modified EVA resins (modified with acid, acrylate, maleic anhydride, individually or in combinations), polyethyleneimine, anhydride modified polyolefins (for example, anhydride modified polypropylene, anhydride modified polyethylene, anhydride modified ethylene vinyl acetate, anhydride modified ethyl methyl acrylate and anhydride modified ethyl acrylic acid), and combinations of two or more of the above, for example.

The thickness of the tie component depends on one or more of the nature of the ink-receiving material, the nature of the component of the support to which the tie layer binds, the physical form of the tie component, and the surface roughness of the support to which the tie layer binds, for example. In some examples the thickness of the tie component in the form of a layer is about 0.5 to about 100 microns, or about 0.5 to about 75 microns, or about 0.5 to about 50 microns, or about 1 to about 100 microns, or about 1 to about 75 microns, or about 1 to about 50 microns, or about 5 to about 100 microns, or about 5 to about 75 microns, or about 5 to about 50 microns, or about 10 to about 100 microns, or about 10 to about 75 microns, or about 10 to about 50 microns, or about 25 to about 100 microns, or about 25 to about 75 microns, or about 25 to about 50 microns, or about 30 to about 100 microns, or about 30 to about 75 microns, or about 30 to about 50 microns, or about 35 to about 75 microns, or about 35 to about 50 microns, for example.

In an example of an ink-printable composition, the support comprises a scrim between two substrates layers and the ink-receiving material is disposed on a surface of one or both of the two substrate layers. In an example of an ink-printable composition, the support comprises a substrate layer and a tie layer disposed on the substrate layer and the ink-receiving material is disposed on a surface of the tie layer. In an example of an ink-printable composition, the support comprises a scrim between two substrate layers and a tie layer disposed on one or both of the two substrate layers and the ink-receiving material is disposed on a surface of the tie layer. In an example of an ink-printable composition, the support comprises a scrim between two tie layers and the ink-receiving material is disposed on a surface of each of the tie layers.

Some examples in accordance with the principles described herein are directed to an ink-printable composition, which comprises a planar scrim having a first side and a second side, an extruded polymer film on the first side and the second side of the planar scrim and, as an ink-receiving material, an extruded film on the extruded polymer film on one or both of the first side and the second side of the planar scrim. The extruded film of ink-receiving material comprises a mixture of a first polymer comprising ethylene residues and vinyl alcohol residues and a second polymer comprising ethylene residues, vinyl acetate residues and maleic anhydride residues. An amount of the first polymer in the mixture is about 50% to about 95%, or about 65% to about 85% by weight.

Fabrication of Ink-Printable Compositions

The ink-printable compositions can be prepared by extrusion processes. For example, in some examples in accordance with the principles described herein, the ink-receiving layer (s) and various components of the support may be formed together by co-extrusion, extrusion coating, hot melt extrusion, cast extrusion process, modification of cast extrusion or coating operation, lamination, blown extrusion process, film extrusion, and sheet extrusion, for example. The extrusion system may comprise, by way of illustration and not limitation, a vertical single screw extruder or a horizontal single screw extruder, for example. In some examples the ink-receiving material is formed on the support by an extrusion process where the support is assembled either prior to or during the extrusion process. Accordingly, such extrusion processes, e.g., co-extrusion, may be employed to assemble other components of the support prior to the extrusion of the ink-receiving layer on the support. As used herein, the terms "extrude" or "extrusion" or "extrusion process(es)" refer to a process(es) wherein the material is heated to a predetermined temperature, which is a temperature at, or above, the processing temperature or melting temperature of the extruded materials, and then deposited on a moving support at a substantially uniform thickness. The extrusion steps of the extrusion processed above may be carried out simultaneously or one or more of the extrusion steps may be carried out independent of other extrusion steps.

The ink-printable compositions in accordance with the present disclosure are fabricated in a manner that avoids the need for multiple time-consuming and costly process steps. The present ink-receiving materials avoid the need for an additional coating that might otherwise be necessary to improve image quality with inks such as latex inks Use of extrusion technology permits the application of the present ink-receiving materials with less expensive manufacturing processes and without comprising overall performance of the resulting ink-printable composition.

As mentioned above, in some examples in accordance with the principles described herein, the ink-printable composition is fabricated using an extruder and an extrusion process, which generally involves melting the material to be extruded, which may be in the form of pellets, beads, flakes, or powder, for example. Depending on the nature of the material to be extruded, the material may also include an extrusion liquid. The melted material is then run through a die, such as, for example, by applying heat and force to the melted material, to produce an extruded form or a three-dimensional profile shape such as, for example, a film or a sheet. In one example an extruded form of the ink-receiving material is prepared by subjecting a mixture of the first polymer and the second polymer to an extrusion process. As indicated above, the mixture of the first polymer and the second polymer may be prepared by compounding or the mixture of the first polymer and the second polymer may be formed in the extrusion apparatus.

In another example, the ink-printable composition is formed by co-extruding a mixture of first polymer and second polymer onto the surface of a support such as, for example, a film of a polyolefin substrate, or by co-extruding a mixture of first polymer and second polymer onto the surface of a support along with another layer such as a tie layer. The temperature and extrusion speed employed in a particular extrusion process depend on one or more of the nature of the ink-receiving material, the nature of the substrate or of other components of the support, and the nature of the extruder, for example. Co-extrusion is a process wherein two different polymer blends are extruded in two different extruders at the same time and then come in contact at the die and stick together.

As mentioned above, in an example of an ink-printable composition, the support comprises a scrim between two substrates layers and an ink-receiving material is disposed on a surface of one or both of the two substrate layers. A method of preparing the above ink-printable composition comprises extruding the two substrate layers on both sides of the scrim and extruding the ink-receiving material on a surface of one or both of the two substrate layers.

Some examples in accordance with the principles described herein are directed to a method of preparing the ink-printable composition that comprises a planar scrim having a first side and a second side, an extruded polymer film on the first side and the second side of the planar scrim, and an ink-receiving material on the extruded polymer film. Referring to FIG. 1, in one example a method for preparing an ink-printable composition, by way of illustration and not limitation, comprises extruding a first polymer film 42 on at least a first side of planar scrim 40 comprising a first side and a second side, extruding a second polymer film 44 on the second side of planar scrim 40, and extruding an ink-receiving material 46 in the form of an extruded film on one or both of first polymer film 42 and second polymer film 44 (on the first side and the second side of planar scrim 40, respectively). The extrusion steps above may be carried out simultaneously or one or more of the extrusion steps may be carried out independent of other extrusion steps. In one example, ink-receiving material 46 comprises a mixture of a first polymer comprising ethylene residues and vinyl alcohol residues and a second polymer derived from ethylene residues, vinyl acetate residues and maleic anhydride residues, wherein an amount of the first polymer in the mixture is about 50% to about 95% by weight or about 65% to about 85% by weight.

Some examples in accordance with the principles described herein are directed to a method of preparing an ink-printable composition that comprises a planar scrim, one or more substrate layers, and a tie layer. A first substrate layer is extruded on at least a first side of a planar scrim comprising a first side and a second side. A tie layer or a second substrate layer is extruded on one of the second side of the planar scrim or a surface of the second substrate layer. An ink-receiving material is extruded on one or both of a surface of the tie layer and a surface of a substrate layer. The extrusion steps above may be carried out simultaneously or one or more of the extrusion steps may be carried out independent of other extrusion steps. In one example, the ink-receiving material comprises a mixture of a first polymer comprising ethylene residues and vinyl alcohol residues and a second polymer comprising ethylene residues, vinyl acetate residues and maleic anhydride residues, wherein an amount of the first polymer in the mixture is about 50% to about 95% by weight or about 65% to about 85% by weight.

Examples of Ink-Printable Compositions

Examples of ink-printable compositions in accordance with the principles described herein are discussed below by way of illustration and not limitation. The present disclosure has broad application and any number of ink-printable compositions may be fabricated based on the teaching herein.

Figure 2:
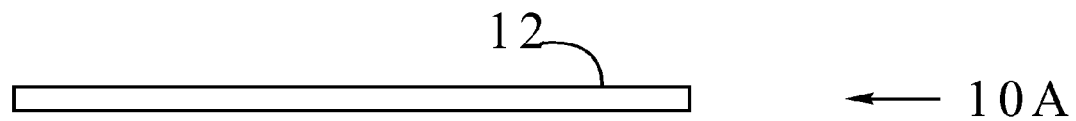
FIG. 2 illustrates in macroscale a schematic of an ink-printable composition according to another example in accordance with the principles described herein.

FIG. 2 illustrates in macroscale a schematic of an example of an ink-printable composition in accordance the principles described herein. Ink-printable composition 10A comprises ink-receiving layer 12.

Figure 3:
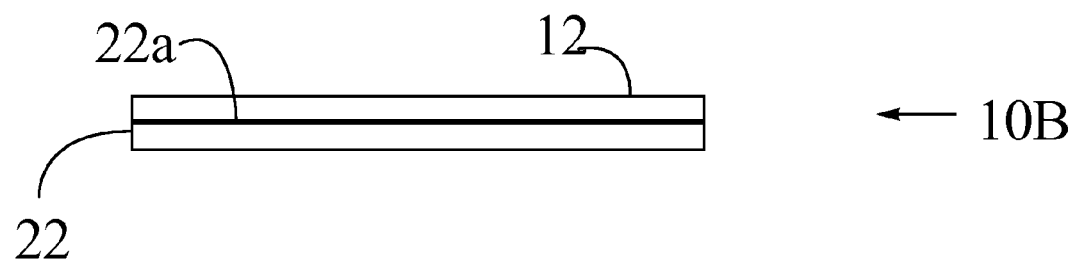
FIG. 3 illustrates in macroscale a schematic of an ink-printable composition according to another example in accordance with the principles described herein.

FIG. 3 illustrates in macroscale a schematic of another example of an ink-printable composition in accordance with the principles described herein. Ink-printable composition 10B comprises ink-receiving layer 12 disposed on surface 22a of support 22, which may comprise "n" number of layers such as, for example, one or more substrate layers, one or more scrims, one or more tie layers, and one or more moisture barriers. At least one of the layers of support 22 is a substrate layer or a scrim.

Figure 4:
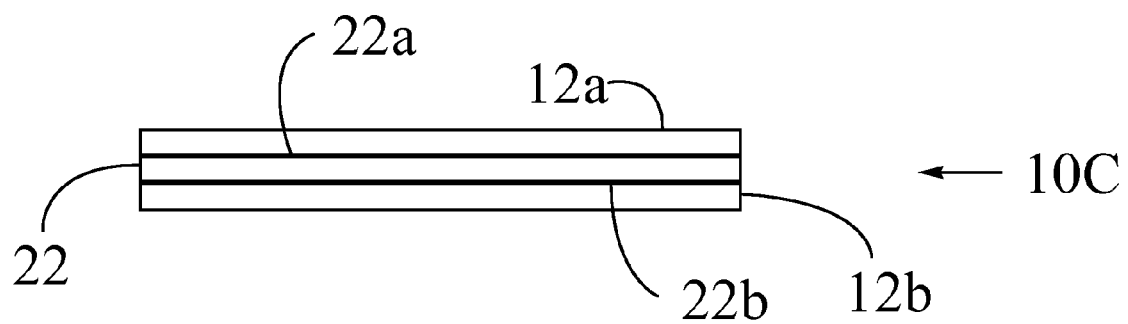
FIG. 4 illustrates in macroscale a schematic of an ink-printable composition according to another example in accordance with the principles described herein.

FIG. 4 illustrates in macroscale a schematic of another example of an ink-printable composition in accordance with the principles described herein. Ink-printable composition 10C comprises ink-receiving layer 12a disposed on a surface 22a of support 22, which may comprise "n" number of layers such as, for example, one or more substrate layers, one or more scrims, one or more tie layers, and one or more moisture barriers, for example, and ink-receiving layer 12b disposed on an opposing surface. At least one of the layers of support 22 is a substrate layer or a scrim.

Figure 5:
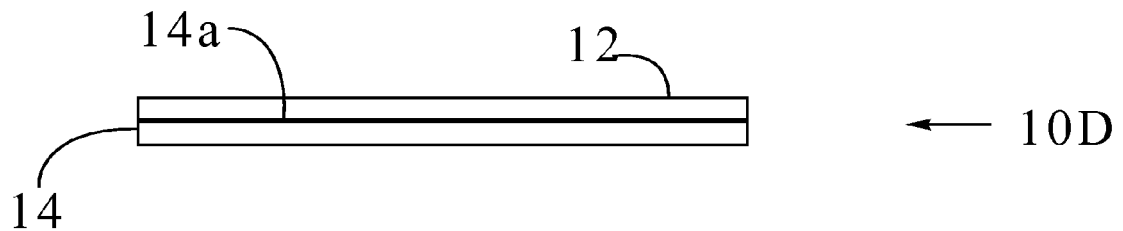
FIG. 5 illustrates in macroscale a schematic of an ink-printable composition according to another example in accordance with the principles described herein.

FIG. 5 illustrates in macroscale a schematic of another example of an ink-printable composition in accordance with the principles described herein. Ink-printable composition 10D comprises ink-receiving layer 12 disposed on a surface 14a of substrate layer 14.

Figure 6:
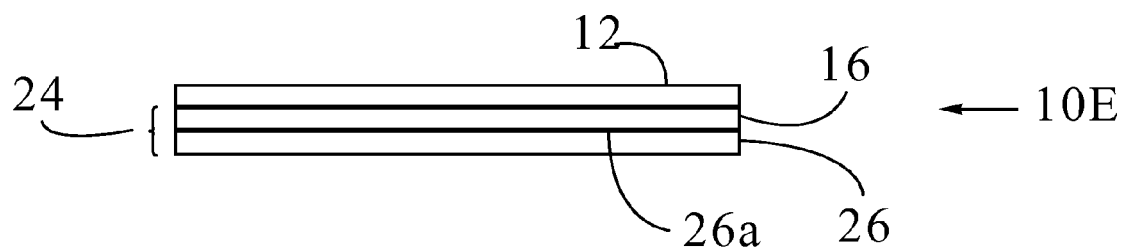
FIG. 6 illustrates in macroscale a schematic of an ink-printable composition according to another example in accordance with the principles described herein.

FIG. 6 illustrates in macroscale a schematic of another example of an ink-printable composition in accordance with the principles described herein. Ink-printable composition 10E comprises ink-receiving layer 12 disposed on support 24, which comprises tie layer 16 and which may comprise "n" number of additional layers 26 such as, for example, one or more additional substrate layers, one or more scrims, one or more tie layers, and one or more moisture barriers, for example. At least one of the additional layers of support 24 is a substrate layer or a scrim. Tie layer 16 provides for adherence of ink-receiving layer 12 to surface 26a of additional layer 26.

Figure 7:
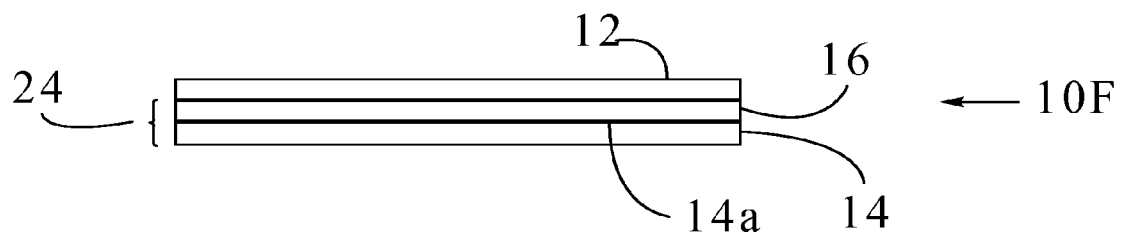
FIG. 7 illustrates in macroscale a schematic of an ink-printable composition according to another example in accordance with the principles described herein.

FIG. 7 illustrates in macroscale a schematic of another example of an ink-printable composition in accordance with the principles described herein. Ink-printable composition 10F comprises ink-receiving layer 12 disposed on support 24, which comprises tie layer 16 and substrate layer 14. Tie layer 16 provides for adherence of ink-receiving layer 12 to surface 14a of substrate layer 14.

Figure 8:
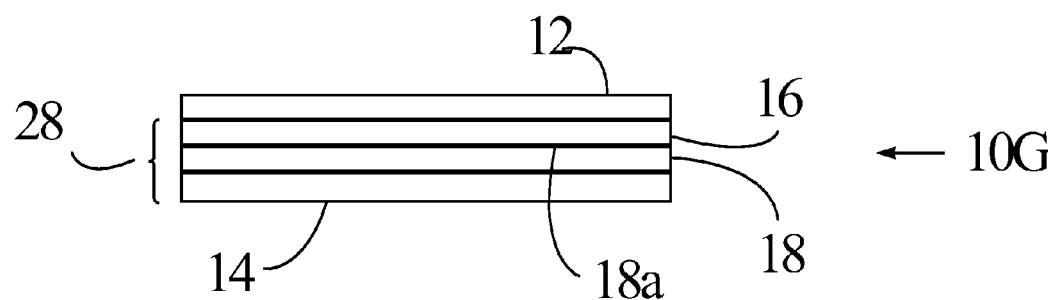
FIG. 8 illustrates in macroscale a schematic of an ink-printable composition according to another example in accordance with the principles described herein.

FIG. 8 illustrates in macroscale a schematic of another example of an ink-printable composition in accordance with the principles described herein. Ink-printable composition 10G comprises ink-receiving layer 12 disposed on support 28, which comprises tie layer 16, scrim 18 and substrate layer 14. Tie layer 16 provides for adherence of ink-receiving layer 12 to surface 18a of scrim 18.

Figure 9:
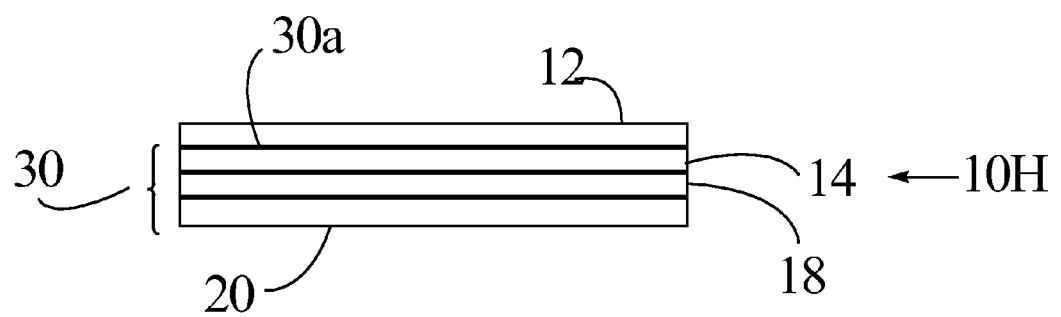
FIG. 9 illustrates in macroscale a schematic of an ink-printable composition according to another example in accordance with the principles described herein.

FIG. 9 illustrates in macroscale a schematic of another example of an ink-printable composition in accordance with the principles described herein. Ink-printable composition 10H comprises ink-receiving layer 12 disposed on surface 30a of support 30, which comprises substrate layer 14, scrim 18 and substrate layer 20.

Figure 10:
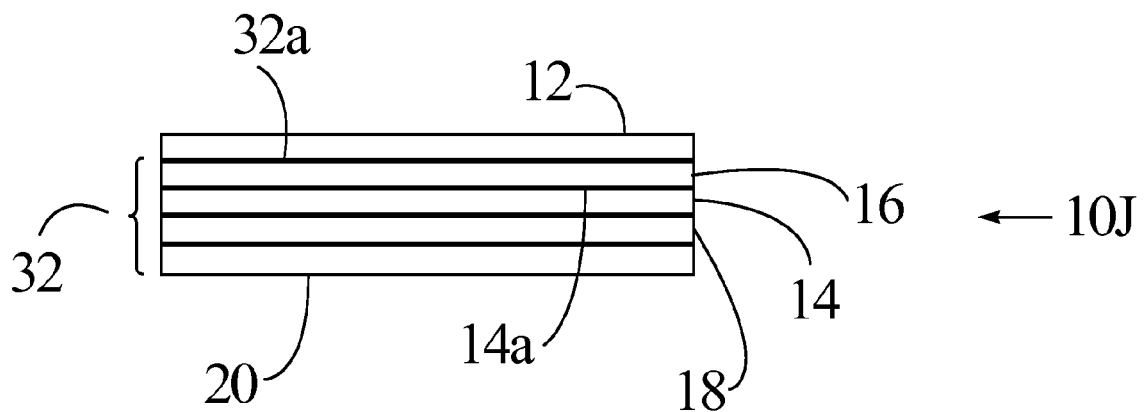
FIG. 10 illustrates in macroscale a schematic of an ink-printable composition according to another example in accordance with the principles described herein.

FIG. 10 illustrates in macroscale a schematic of another example of an ink-printable composition in accordance with the principles described herein. Ink-printable composition 10J comprises ink-receiving layer 12 disposed on surface 32a of support 32, which comprises tie layer 16, substrate layer 14, scrim 18 and substrate layer 20. Tie layer 16 provides for adherence of ink-receiving layer 12 to surface 14a of substrate layer 14.

Figure 11:
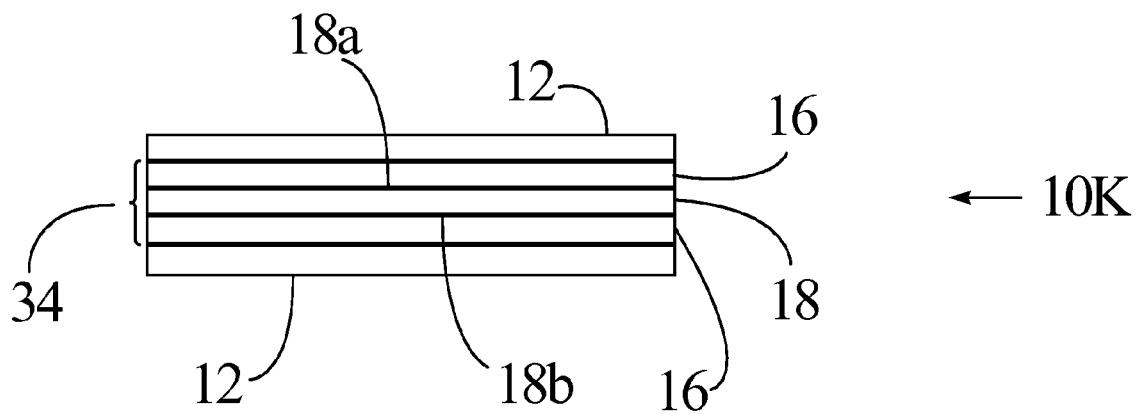
FIG. 11 illustrates in macroscale a schematic of an ink-printable composition according to another example in accordance with the principles described herein.

FIG. 11 illustrates in macroscale a schematic of another example of an ink-printable composition in accordance with the principles described herein. Ink-printable composition 10K comprises ink-receiving layers 12 disposed on opposing surfaces of support 34, which comprises tie layer 16, scrim 18, and second tie layer 16. Tie layers 16 provide for adherence of ink-receiving layers 12 to opposing surfaces 18a and 18b of scrim 18.

Uses of Ink-Printable Compositions

Examples of the present ink-printable compositions may be employed as printing media where they are particularly adapted for use with inkjet ink compositions. Such compositions include, for example, latex inkjet ink and UV-curable inkjet inks, and combinations thereof. Examples of the present ink-printable compositions can be printed at a broad range of temperatures depending on, for example, the nature of the printing apparatus. In some examples, by way of illustration and not limitation, the present ink-printable compositions can be printed on HP DESIGNJET® L25500 printer (Hewlett Packard, Palo Alto Calif.) with the curing zone temperature range of about 70° C. to about 100° C., or about 70° C. to about 130° C., or about 80° C. to about 130° C. or about 80° C. to 100° C. Curing of the present compositions at lower temperature provides for enhanced performance of the present compositions during the printing and curing processes and in use as a printed material. The phrase "latex inkjet ink" refers to an ink composition containing polymeric latex. The phrase "UV-curable inkjet ink" means an ink composition containing UV-curable materials. The phrase "inkjet ink" means an ink that is suited for use in one or both of an inkjet device and an inkjet printing process.

In an example the inkjet ink comprises one or more colorants that impart the desired color to the printed item. Such colorants include, for example, dyes, and pigments. The colorant is generally present in the inkjet ink in an amount required to produce the desired contrast and readability. Pigments that can be used may be organic or inorganic and include, for example, self-dispersed pigments and non self-dispersed pigments. The pigment can be of any color including, but not limited to, black, blue, brown, cyan, green, white, violet, magenta, red, orange and yellow, as well as spot colors from mixtures thereof.

Examples of organic pigments that may be present in an inkjet ink composition include, by way of illustration and not limitation, perylenes, phthalocyanine pigments (for example, phthalo green, phthalo blue), cyanine pigments (Cy3, Cy5, and Cy7), naphthalocyanine pigments, nitroso pigments, monoazo pigments, diazo pigments, diazo condensation pigments, basic dye pigments, alkali blue pigments, blue lake pigments, phloxin pigments, quinacridone pigments, lake pigments of acid yellow 1 and 3, isoindolinone pigments, dioxazine pigments, carbazole dioxazine violet pigments, alizarine lake pigments, vat pigments, phthaloxy amine pigments, carmine lake pigments, tetrachloroisoindolinone pigments, perinone pigments, thioindigo pigments, anthraquinone pigments and quinophthalone pigments, and mixtures of two or more of the above and derivatives of the above.

Inorganic pigments that may be present in an inkjet ink composition, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

In many examples the colorant is suspended, dispersed or dissolved in a suitable ink vehicle. As used herein, "ink vehicle" is defined to include any liquid composition that is used to carry colorants, including pigments, to an ink-receiving material. A wide variety of liquid vehicles may be used. In some examples the liquid vehicle may include one or more of a variety of different agents, including without limitation, surfactants, solvents and co-solvents, buffers, biocides, viscosity modifiers, sequestering agents, stabilizing agents, and water, for example.

The ink-printable compositions disclosed herein may be used to prepare display items using any suitable inkjet printer that is ordinarily used for inkjet printing. Using an appropriate printer, ink may be applied to the ink-receiving material of an example of an ink-printable composition in accordance with the principles described herein to create a desired display comprising a printed image with subsequent drying of the image following application of the ink.

Some examples in accordance with the principles described herein include a display comprising an ink-printable composition in accordance with the principles described herein and an inked design on the ink-receiving material. The particular nature and configuration of the components of an ink-printable composition (such as the nature of the first and second polymers and the nature of the support) may be chosen for a desired use, which includes, by way of illustration and not limitation, indoor and outdoor signs, banners, (e.g., outdoor banners, indoor banners, tradeshow banners and event banners), point of purchase displays, building wraps, billboards, displays, and wall murals, for example.

For the above uses, examples of supports include, but are not limited to, resin coated papers (or photo-base papers), papers, clear films, translucent films, scrim banners (woven and non-woven), other types of banners, coated papers, fabrics, art papers (e.g., water color paper), and plastic film, for example. As mentioned above, one of the components of the support chosen may comprise a porous or non-porous surface. In an example, at least one of the components of the support is paper. In another example at least one of the components of the support is a scrim banner, which is a woven-core of polymer tapes (LDPE, HDPE, PVC, and polyester, for example) with an extruded coating layer locking them together. Such products are available from PGI Corporation (Ontario, Canada), Engineered Coated Products (BC, Canada), Heytex (Germany), Maiweave (Springfield, Ohio), or Interwrap Inc. (Vancouver, Wash.).

As mentioned above, the ink-printable compositions comprising the ink-receiving material in accordance with the principles described herein exhibit at least all of the following characteristics: good adhesion of a display ink, good durability (resistance to chemical rubbing and scratching) and good image quality. Furthermore, display items employing the present ink-printable compositions also exhibit one or more of good strength and tear resistance, weather and temperature resistance, fade resistance, solvent resistance, and scratch resistance, for example, and are, therefore, well suited for outdoor use. Some examples of display items employing the present ink-printable compositions are able to withstand harsh weather conditions without fading and loss of vibrancy. Examples of display items employing the present ink-printable compositions are light weight and recyclable.

Definitions

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited as well as fractions of the numbers 2 to 50. As used herein, the singular forms "a", "an" and "the" include plural referents unless the content clearly dictates otherwise. In some instances, "a" or "an" as used herein means "at least one" or "one or more." The designations "first" and "second" are used solely for the purpose of differentiating between two items such as "first polymer" and "second polymer" and are not meant to imply any sequence or order or importance to one item over another or any order of operation, for example.

EXAMPLES

Parts and percentages are by weight unless indicated otherwise.

Examples of ink-printable compositions were prepared using an extrusion system having a vertical single screw extruder. The extrusion process was carried out with a 25.4 cm wide extrusion die and with a 30.5 cm wide Matte or Glossy Finish primary cooling roll at a temperature of from 177° C. to 260° C.

Example 1

SOARNOL® A4412 polymer (Soarus L.L.C.) (a copolymer of ethylene (44%) and vinyl alcohol (56%) with a melt index number at 12) (90 grams (g)) and 10 g of OREVAC-T® 9304 polymer (Arkema) (a terpolymer of ethylene (74.84%), vinyl acetate (56.00%) and maleic anhydride (0.16%)) were mixed well in a mixing bag prior to placing the mixture in the extruder. The mixture was extruded as a film onto one side of a support, which was a scrim having a thickness of about 76.2 microns. The temperature during the extrusion was controlled at 190 to 260° C. The thickness of the extruded film was controlled at about 50.8 to about 76.2 microns. Then, the extruded film was printed with a 10 pass print mode and cured at 90° C. using an HP DESIGNJET® L25500 and held for 24 hours, after which image quality, chemical rubbing resistance, scratch resistance and ink adhesion evaluations were performed.

Example 2

An example was carried out in a manner similar to that of Example 1 using 80 g of SOARNOL® A4412 polymer and 20 g of OREVAC-T® 9304 polymer.

Example 3

An example was carried out in a manner similar to that of Example 1 using 70 g of SOARNOL® A4412 polymer and 30 g of OREVAC-T® 9304 polymer.

Example 4

An example was carried out in a manner similar to that of Example 1 using 80 g of SOARNOL® E3808 polymer (Soarus L.L.C.) (a copolymer of ethylene (38%) and vinyl alcohol (62%)) and 20 g of OREVAC-T® 9304 polymer.

Example 5

An example was carried out in a manner similar to that of Example 1 using 80 g of SOARNOL® AT4403 polymer (Soarus L.L.C.) (a copolymer of ethylene (44%) and vinyl alcohol (56%) with a melt index number at 3) and 20 g of OREVAC-T® 9304 polymer.

Example 6

An example was carried out in a manner similar to that of Example 1 using 80 g of SOARNOL® A4412 polymer and 20 g of BYNEL® E418 polymer.

Example 7

An example was carried out in a manner similar to that of Example 1 using 100 g of SOARNOL® A4412 polymer.

Example 8

An example was carried out in a manner similar to that of Example 1 using 100 g of OREVAC-T® 9304 polymer.

Example 9

An example was carried out in a manner similar to that of Example 1 using 80 g of SOARNOL® A4412 and 20 g of OREVAC® OE825 (Arkema) (a maleic anhydride-modified polyethylene polymer).

The extruded films from Examples 1-9 above were subjected to tests for image quality, chemical rubbing resistance, scratch resistance and ink adhesion. The environmental temperature was in the range of 22° C. to 27° C., and the relative humidity was in the range of 45% to 55%. Image quality assessment was conducted by visual ranking with a ranking score based on a scale of 1 to 5 with 1 being the best and 5 being the worst.

Image quality of these samples was evaluated by visually rating the bleed, coalescence, and color vibrancy of the printed materials. The tested samples were rated visually on a scale of 1 to 5 based on the following criteria: 1—No visible ink coalescence and color to color bleed in the printed sample and high color vibrancy; 2—Slight ink coalescence and color to color bleed in the printed sample and medium high color vibrancy; 3—Moderate ink coalescence and color to color bleed in the printed sample and moderate color vibrancy; 4—Poor ink coalescence and color to color bleed in the printed sample and poor color vibrancy; 5—Severe ink coalescence and color to color bleed in the printed sample and low color vibrancy.

Chemical rubbing resistance tests were carried out using a Taber Linear Abrasion Tester Model 5750 (Taber Industries, North Tonawanda, N.Y.). The printed sample was placed in a flat and smooth surface underneath the Taber Linear Abrasion Tester. Five (5) ml of deionized water or WINDEX® cleaner were applied to the testing color area on the printed sample. The load force was set to 250 g and the number of cycles to 5 in the tester. The testing was conducted and the tested samples were rated visually on a scale of 1 to 5 based on the following criteria: 1—No ink transfer to cloth, no damage to printed sample; 2—Little ink transfer to cloth, no damage to printed sample; 3—Some ink transfer to cloth, no damage to printed sample; 4—White showing through in printed sample; 5—Severe damage to printed sample.

Samples from the above Examples were subjected to a scratch resistance test using a coin scratch method. A coin shaft was applied to the testing sample with a constant pressure and the shaft was moved at a constant speed. The tested samples were rated visually on a scale of 1 to 5 based on the following criteria: 1—No visible change in the printed sample; 2—Visible gloss change in the printed sample; 3—Little ink removal in the printed sample; 4—Some ink removal in the printed sample; 5—Severe ink removal in the printed sample.

Ink adhesion tests were carried out as follows: Samples from the above Examples were subjected to an adhesion test using a "tape peel" test in which a piece of adhesive tape (3M tape #610) was applied to the ink layer and left to sit for 1 minute. The tape was then removed. The amount of ink transferred to the tape was analyzed visually.

The tested samples were rated visually on a scale of 1 to 5 based on the following criteria: 1—No visible change in the printed sample; 2—Slight ink removal in the printed sample; 3—Little ink removal in the printed sample; 4—Some ink removal in the printed sample; 5—Severe ink removal in the printed sample.

The results of the above tests are summarized in Table 1 below where, as mentioned above, the ranking is based on 1 to 5 scale where 1 is the best and 5 is the worst. A number of 3 or above is considered unacceptable.

TABLE 1

| Film: Example | Image quality | Chemical rubbing resistance | Scratch resistance | Ink adhesion to extruded film |
|---|---|---|---|---|
| 1 | 1 | 1 | 1 | 1 |
| 2 | 1 | 1 | 1 | 1 |

TABLE 1-continued

| Film: Example | Image quality | Chemical rubbing resistance | Scratch resistance | Ink adhesion to extruded film |
|---|---|---|---|---|
| 3 | 2 | 2 | 1 | 1 |
| 4 | 1 | 2 | 1 | 1 |
| 5 | 2 | 1 | 1 | 1 |
| 6 | 1 | 1 | 1 | 1 |
| 7 | 3 | 1 | 1 | 2 |
| 8 | 1 | 4 | 4 | 2 |
| 9 | 4 | 3 | 1 | 5 |

As can be seen, only the films produced in Examples 1-6, which are in accordance with the principles described herein, yielded good results in all four tests, namely, image quality, chemical rubbing resistance, scratch resistance and ink adhesion.

Although the foregoing examples have been described in some detail by way of illustration and example for purposes of clarity of understanding, it will be readily apparent to those of ordinary skill in the art in light of the teachings of this disclosure that certain changes and modifications may be made thereto without departing from the spirit or scope of the appended claims. Furthermore, the foregoing description, for purposes of explanation, used specific nomenclature to provide a thorough understanding of the principles disclosed herein. However, it will be apparent to one skilled in the art that the specific details are not required in order to practice the principles described herein. Thus, the foregoing descriptions of specific examples in accordance with the principles described herein are presented for purposes of illustration and description; they are not intended to be exhaustive or to limit the disclosure to the precise forms disclosed. Moreover, examples herein are intended to be illustrative only and are presented for discussion purposes and not by way of limitation. Many modifications and variations are possible in view of the above teachings. The examples were chosen and described in order to explain the principles disclosed herein and their practical applications and to thereby enable others skilled in the art to utilize these principles.

What is claimed is:

1. An ink-printable composition comprising an ink-receiving material in extruded form, the ink-receiving material comprising a mixture of (i) a first polymer selected from the group consisting of a polymer comprising ethylene residues and vinyl alcohol residues and a polymer comprising vinyl alcohol residues and (ii) a second polymer comprising ethylene residues, vinyl acetate residues and maleic anhydride residues wherein an amount of the first polymer in the mixture is about 50% to about 95% by weight;
the ink-printable composition further comprising a support associated with the ink-receiving material, wherein the support compromises a scrim between two substrates layers, and wherein the ink-receiving material is disposed on a surface of one or both of the two substrate layers.

2. The ink-printable composition according to claim 1, wherein a composition of the support is selected from the group consisting of polyethylene, polypropylene, polymethylpentene, polybutylene, polyethylene terephthalate, polystyrene, polycarbonate, polyamide, and cellulose, and combinations of two or more thereof.

3. The ink-printable composition according to claim 1, wherein a composition of the support comprises one or both of low density polyethylene and high density polyethylene.

4. A method of preparing the ink-printable composition of claim 1, the method comprising:
(a) extruding the two substrate layers on both sides of the scrim, and
(b) extruding the ink-receiving material on a surface of one or both of the two substrate layers.

5. The ink-printable composition according to claim 1, wherein the first polymer comprises ethylene residues and vinyl alcohol residues and an amount of vinyl alcohol residues in the first polymer is about 50% to about 99% by weight.

6. The ink-printable composition according to claim 1, wherein an amount of vinyl acetate residues in the second polymer is about 20% to about 30% and an amount of maleic anhydride residues in the second polymer is about 0.05% to about 5%.

7. A display comprising the ink-printable composition according to claim 1 and an inked design on the ink-receiving material.

8. An ink-printable composition comprising:
(a) a planar scrim having a first side and a second side;
(b) an extruded polymer film on the first side and the second side of the planar scrim; and
(c) as an ink-receiving material, an extruded film on the extruded polymer film on one or both of the first side and the second side of the planar scrim, the extruded film of the ink-receiving material comprising a mixture of (i) a first polymer comprising ethylene residues and vinyl alcohol residues and (ii) a second polymer comprising ethylene residues, vinyl acetate residues and maleic anhydride residues, wherein an amount of the first polymer in the mixture is about 50% to about 95% by weight.

9. The ink-printable composition according to claim 8, wherein the extruded polymer film comprises one or both of low density polyethylene and high density polyethylene.

10. A method of preparing the ink-printable composition according to claim 8, the method comprising:
(a) extruding a first polymer film on at least a first side of the planar scrim,
(b) extruding a second polymer film on the second side of the planar scrim, and
(c) extruding the ink-receiving material in the form of the extruded film on one or both of the first polymer film and the second polymer film.

* * * * *

UNITED STATES PATENT AND TRADEMARK OFFICE
CERTIFICATE OF CORRECTION

Page 1 of 1

PATENT NO. : 9,005,724 B2
APPLICATION NO. : 13/876840
DATED : April 14, 2015
INVENTOR(S) : Bor-Jiunn Niu et al.

It is certified that error appears in the above-identified patent and that said Letters Patent is hereby corrected as shown below:

In the Claims

In column 17, line 53, in Claim 1, delete "compromises" and insert -- comprises --, therefor.

Signed and Sealed this
Twenty-ninth Day of March, 2016

Michelle K. Lee
*Director of the United States Patent and Trademark Office*